United States Patent [19]
Johnson

[11] Patent Number: 5,063,763
[45] Date of Patent: Nov. 12, 1991

[54] LOCKING DEVICE FOR BOAT SONAR UNITS AND THE LIKE

[76] Inventor: Clyde T. Johnson, P.O. Drawer 100, Escanaba, Mich. 49829

[21] Appl. No.: 592,370

[22] Filed: Oct. 3, 1990

[51] Int. Cl.⁵ .............................................. E05B 73/00
[52] U.S. Cl. ........................................... 70/58; 70/34
[58] Field of Search .................. 70/58, 57, 32, 33, 38, 70/258

[56] References Cited

U.S. PATENT DOCUMENTS

| | | | |
|---|---|---|---|
| 1,971,797 | 8/1934 | Shinn | 70/32 |
| 4,081,979 | 4/1978 | Dowson | 70/58 |
| 4,942,745 | 7/1990 | Jacobs | 70/58 |

*Primary Examiner*—Robert L. Wolfe
*Attorney, Agent, or Firm*—Foley & Lardner

[57] ABSTRACT

A locking device for locking instruments such as boat sonar units to their mounting brackets includes a key tumbler housing and a casing surrounding the key tumbler housing so that the tumbler housing rotates within the casing when a key is inserted in the tumbler housing, and remains locked in a fixed position when the key is removed. A threaded stud unit is connected to a rearward end of the tumbler housing which engages with a threaded hole in the instrument body when the tumbler housing is turned with the key. The instrument is locked to the bracket by passing the threaded stud through an opening in the bracket and engaging the stud within the threaded hole in the instrument body. A stop member is provided on a rear face of the casing which seats within the bracket opening, so that when the key is removed from the tumbler housing the locking device cannot be unscrewed from the instrument.

14 Claims, 4 Drawing Sheets

LOCKING DEVICE FOR BOAT SONAR UNITS AND THE LIKE

FIELD OF THE INVENTION

The present invention relates to locking and security devices. More specifically, the present invention relates to locking devices which may be used to lock removable instruments to an instrument bracket by replacing threaded handles utilized to removably mount the instrument in the bracket with a locking device.

BACKGROUND OF THE INVENTION

Various types of instruments with display screens, such as sonar devices for pleasure boats and other small marine craft, are designed with threaded holes in the opposed sides of the instrument body. The instrument is typically sold with a gimbal type bracket having openings, which are generally slots, which align with the threaded holes in the instrument body. A pair of handles with threaded rod projections pass through the openings in the bracket and threadedly engage within the threaded holes in the instrument body to suspend the instrument within the bracket. This mounting system allows the instrument to be pivoted to any desired angle for viewing. By tightening the handles so that the bracket is tightly sandwiched between the handle and the instrument body, the instrument may be fixed at a particular angle with respect to the bracket.

By reversing these mounting steps, the instrument may be removed from the instrument bracket. A disadvantage of this removable mounting system is that an instrument is vulnerable to theft.

Locking devices incorporating screw-type locks are well known in the art. Screw-type locks essentially comprise a tumbler housing rotatable in a casing when the proper key is inserted into the housing. The housing has a threaded stud projecting from the non-keyed end of the tumbler housing. The tumbler housing is mounted within the casing so that it rotates within the casing when the key is inserted into the tumbler housing and is held in a fixed position with respect to the casing when the key is withdrawn.

Screw-type locks are of two general types: locks where the threaded stud engages with a threaded opening in a second piece of the lock, such as the locks disclosed in U.S. Pat. No. 4,428,211 to Hermann and U.S. Pat. No. 4,711,106 to Johnson, and locks where the threaded stud engages with a threaded opening in the object to be locked. An example of a locking assembly which utilizes a threaded opening in the object to be locked is U.S. Pat. No. 3,600,912 to Foreman, which discloses a lock assembly for locking sliding shutters.

SUMMARY OF THE INVENTION

The present invention utilizes a screw-type locking device as a replacement for the threaded handles provided with instrument brackets for instruments such as sonar devices. The locking device includes a rotatable casing with an outer surface and an inner surface adapted to fit around a key tumbler housing and at least one keyway extending along the inner surface of the casing. The tumbler housing is mounted in an axially fixed position within the casing so that the tumbler housing rotates freely with respect to the casing when a key is inserted into a keyhole at a forward end of the tumbler housing and turned, and the tumbler housing is locked in a fixed position with respect to the casing when the key is withdrawn from the tumbler housing. A threaded stud unit is attached to a rearward end of the tumbler housing by seating a projection on the head of the threaded stud unit into a complementary recess in the rearward end of the tumbler housing. The threaded stud rotates when the tumbler housing is rotated within the casing by use of the key, and the threaded stud can thereby be engaged with, and drawn into, a complementary threaded hole in the instrument body. A stop member, which is preferably a pin, is mounted on a rearward face of the casing. The stop member is designed to fit within the opening in the instrument bracket when the threaded stud is fully engaged within the complementary threaded hole in the instrument body. When the stop member is positioned in this manner, the locking device cannot be unscrewed from the instrument because the stop member will abut the bracket opening. The locking device may only be removed from the instrument by using the key to back the threaded stud out of the threaded hole, and the stop member out of the bracket opening.

The screw-type lock of the present invention in a preferred embodiment has a threaded stud which is not integrally associated with the key tumbler housing, but rather is a separate threaded stud unit. The threaded stud unit is attached to the key tumbler housing by seating a projection on the head of the threaded stud unit into a complementary recess in the rearward end of the key tumbler housing. An advantage of this system is that the threaded stud unit may be formed of a different material than the tumbler housing. For example, by forming the threaded stud unit from stainless steel, the exposed threaded stud will be rust proof and better able to withstand the elements. Another advantage to using a separate threaded stud unit is that the screw diameter may be changed for the locking device without having to change the entire lock casting. This is an economic advantage in terms of machine tooling as well as an advantage in terms of inventory control. A further advantage of the separate threaded stud unit is that the projection is in essence allowed to float within the complementary recess in the tumbler housing, thus eliminating pressure on the tumbler housing slot which is cut away and vulnerable to breakage. Finally, connection of the threaded stud unit to the tumbler housing is simple and fast, making for easier assembly and manufacturing of the locking device. The stud unit itself may be formed of two parts, a head and removable adaptor stud. The adaptor stud has a rearward portion threaded to screw into a hole in the head of the stud unit and a forward portion which is adapted to thread into a particular instrument. The locking device may thus be adapted to different instruments simply by changing the adaptor stud.

Other objects, features and advantages of the invention will be apparent with the following detailed description taken in conjunction with the accompanying drawings showing a preferred embodiment of the invention.

DETAILED DESCRIPTION OF THE INVENTION

Figure 1:
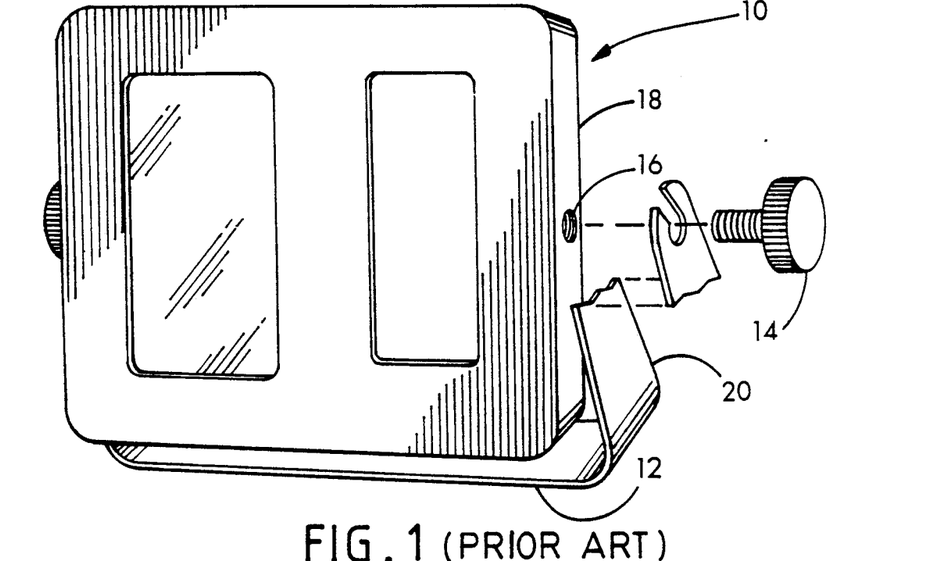
FIG. 1 is a view of a type of instrument which may be removably attached to an instrument bracket with threaded handles that engage with threaded holes in opposed sides of the instrument body.
Figure 2A:
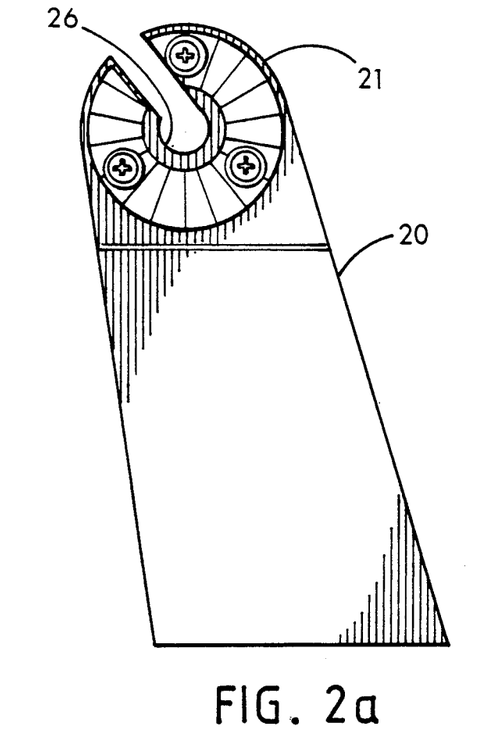
FIG. 2a is a side view of an arm of an instrument bracket having an opening and a ribbed washer surrounding the opening.
Figure 2B:
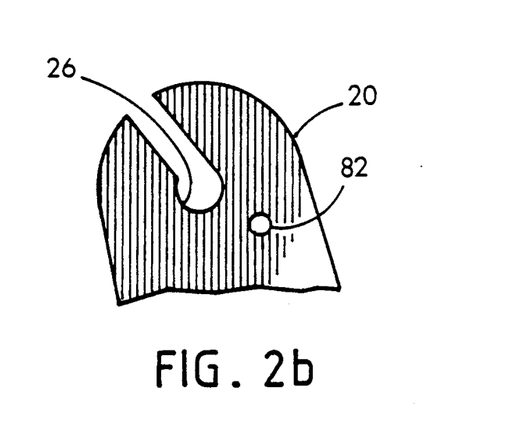
FIG. 2b is a side view of an alternative arm of an instrument bracket having an opening and an aperture.

Referring more particularly to the drawings, wherein like numbers refer to like parts, FIG. 1 shows generally an example of an instrument 10, which may be removably mounted in an instrument bracket 12 by means of threaded handles 14 which engage with threaded holes 16 in opposed sides of the instrument body 18. FIG. 2a shows generally a typical arm 20 of an instrument bracket 12 with an opening 26, and a ribbed washer 21 around the opening 26. FIG. 2b shows a typical arm 20 of an instrument bracket 12 without a ribbed washer 26 and having an aperture 82 in the arm 20.

Figures 3, 3A:
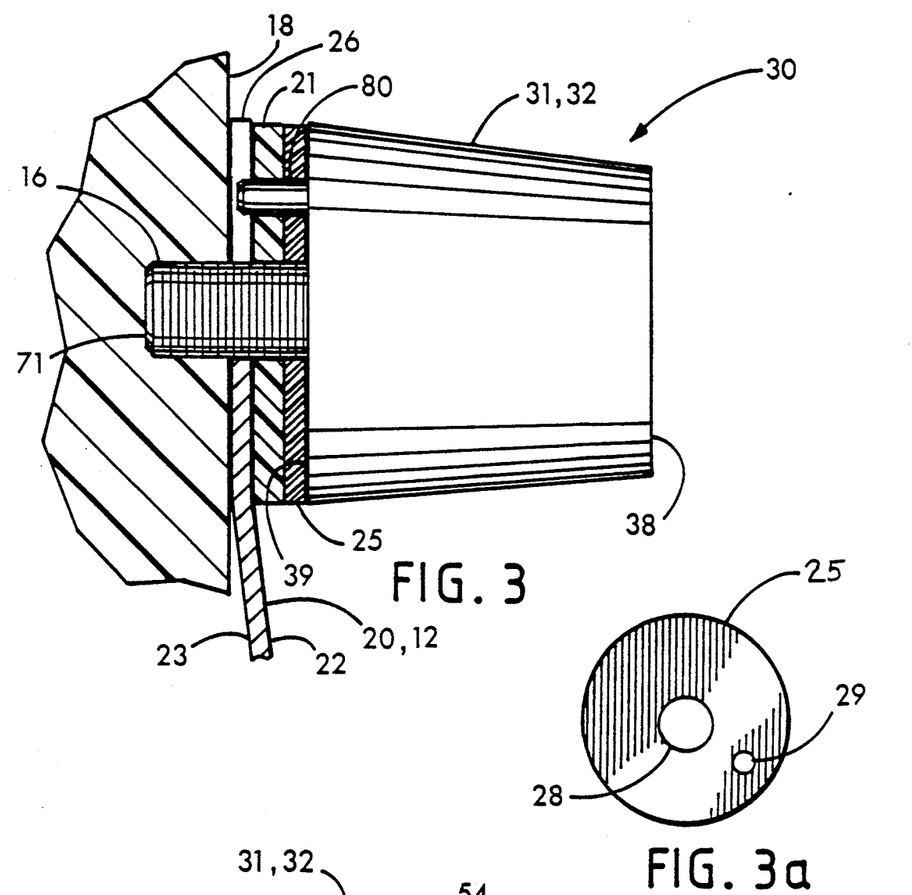
FIG. 3 is a view of the locking device fully engaged within a section of the instrument body, with the instrument bracket between the locking device and the instrument, and the stop member within the bracket opening.
FIG. 3a is a view of a rubber washer having a central hole and an off-center hole.

FIG. 3 shows a locking device 30 in accordance with the present invention in position locking an instrument 18 to the bracket 20. The locking device 30 includes a casing 31 and a threaded stud 71 passing through the opening 26 in the arm 20 of the instrument bracket 12, which has a ribbed washer 21 as shown in FIG. 2a, and threadedly engaged within a threaded hole 16 in the instrument body 18. A stop member 80, which is shown as a pin, is seated within the bracket opening 26. A rubber washer 25 is placed between a rearward face 39 of the casing 31 and the bracket arm 20 as a spacer.

FIG. 3a shows the rubber washer 25 of FIG. 3 which has a central hole 28 adapted to align with the opening 26 in the bracket arm 20 and an off-center hole 29 adapted to receive a stop member 80.

Figure 4:
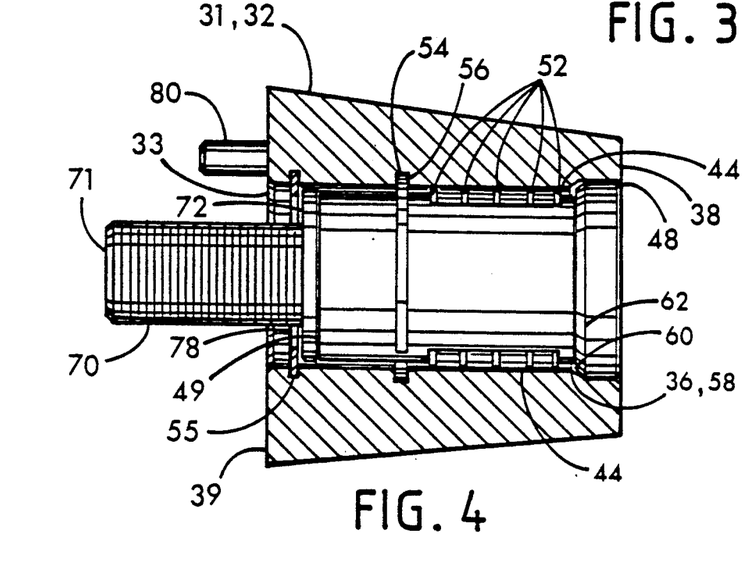
FIG. 4 is a cross-sectional view of the locking device the key tumbler housing within the casing.
Figure 7A:
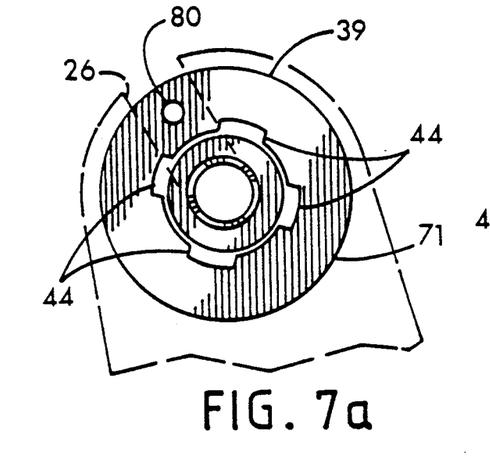
FIG. 7a is a rear of the locking device and a phantom view of the instrument bracket arm showing placement of the stop member on the rearward face of the casing.
Figure 7B:
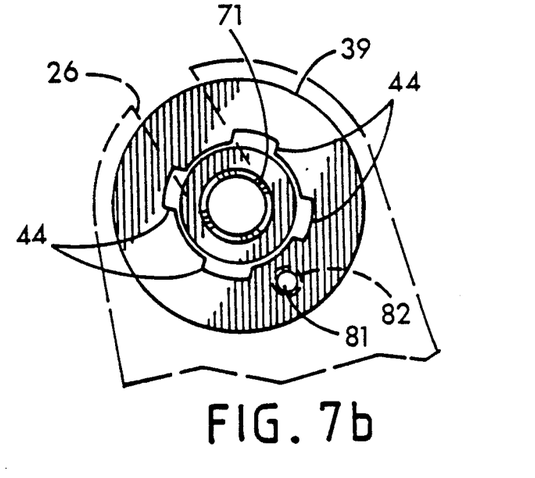
FIG. 7b is the same rear view of the locking device showing an alternative placement of the stop member within aperture in the bracket arm.

As shown in FIG. 4, the casing 31 has an inner surface 33 defining a hollow interior of the casing. In the preferred embodiment, the inner surface 33 has four axially oriented keyways 44 extending along the inner surface 33 located 90 degrees apart, as shown in FIGS. 4 and 7. The outer surface 32 of the casing 31 is preferably tapered as shown in FIG. 3 to inhibit grasping of the casing with a wrench and make it more difficult to use burglary tools to break the lock.

Figure 5:
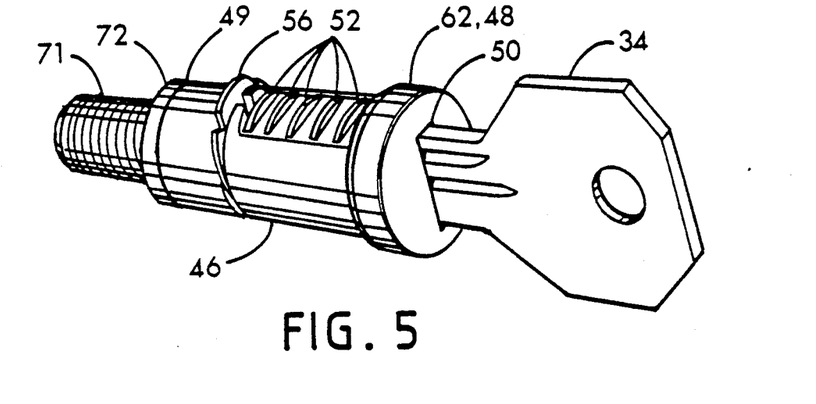
FIG. 5 is a perspective view of the key tumbler housing, threaded stud at the rear end of the tumbler housing and a key inserted into the tumbler housing keyhole.

A tumbler housing 46 is mounted within the casing 31 in an axially fixed position. At the forward end 48 of the tumbler housing 46 is a keyhole 50 into which the key 34 may be inserted, as best shown in FIG. 5. In a preferred embodiment, the tumbler housing 46 includes slide tumblers 52 which are substantially contained within the tumbler housing 46 when the key 34 is fully inserted into the keyhole 50, so the tumbler housing 46 rotates within the casing 31. When the key 34 is withdrawn, the slide tumblers 52 are biased to extend partially outside of the tumbler housing 46 into one of the four axially oriented keyways 44, when aligned therewith, to prevent the tumbler housing 46 from rotating within the casing 31. Since there are four keyways 44 on the inner surface 33 of the casing 31, the tumbler housing 46 can lock into a fixed rotational position every one-quarter turn of the key 34.

In the preferred locking device, the inner surface 33 of the casing 31 also has a larger annular groove 54, as best shown in FIG. 4. The tumbler housing 46 includes a catch ring 56 which is biased to extend radially outwardly from the tumbler housing 46 as shown in FIGS. 4 and 5. This biasing of the catch ring 56 causes the catch ring 56 to extend from the tumbler housing 46 into the larger annular groove 54 to maintain the tumbler housing 46 in its axially fixed position within the casing 31. As the tumbler housing 46 is turned by the key 34 the catch ring 56 maintains its position within the larger annular groove 54 so that the tumbler housing 46 can neither move forwardly nor rearwardly from its position.

The forward end 36 of the casing inner surface 33 is preferably widened to form a forward sheath 58 and a radial retention surface 60 which faces in a forward direction. A forward end 48 of the tumbler housing 46 is also widened to form a flange 62 which has an outside diameter which is slightly smaller than the inside diameter of the forward sheath 58 so that the flange 62 fits snugly within the forward sheath 58 when the tumbler housing 46 is properly positioned within the casing 31. The fit must not be so tight that the tumbler housing 46 cannot rotate within the casing 31. When the flange 62 is seated within the forward sheath 58, the flange 62 should obscure the keyways 44 and the casing inner surface 33 so that they cannot be pried. In order for the keyways 44 to be obscured, they cannot extend into the forward sheath 58. Therefore, the forward end 36 of the casing inner surface 33 which forms the forward sheath 58 must be widened to an extent which is at least as far outward radially as the radially outermost extent of the keyways 44, i.e., that point within the keyways 44 which is radially furthest from the central axis of the casing 31. The forward sheath 58 should extend rearwardly within the casing 31 to a point where the radial retention surface 60 abuts against the flange 62 to provide further restraint against the tumbler housing 46 moving rearwardly, but such that the forward end 48 of the tumbler housing 46 is flush with the forward face 38 of the casing 31.

Figure 6:
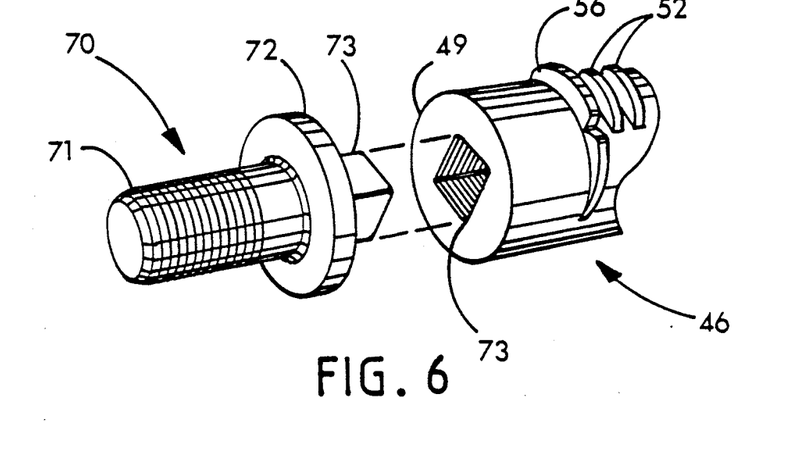
FIG. 6 is a perspective view of a portion of the tumbler housing and the attachment of the threaded stud unit to the housing.

As shown in FIGS. 5 and 6, the threaded stud unit 70 of the locking device 30 attaches to the rearward end 49 of the tumbler housing 46. The threaded stud unit 70 comprises a threaded stud 71 integrally connected to a head 72 having a projection 73. The projection 73 seats into a complementary recess 75 in the rearward end 49 of the tumbler housing 46. As shown in FIG. 6, the head 72 is disk shaped and has a square projection 73. The square projection 73 seats into a square complementary recess 75 in the tumbler housing 46. When the projection 73 is seated in the recess 75, the head 72 abuts the rearward end 49 of the tumbler housing 46.

The casing 31 inner surface 33 also has a shallow annular groove 55 located rearwardly of the larger annular groove 54, as shown in FIG. 4. A snap ring 78 seats into the shallow annular groove 55 so that the head 72 of the threaded stud unit 70 is held in contact with the tumbler housing 46 to prevent the threaded stud unit from moving rearwardly within the casing 31 and detaching from the tumbler housing 46. Both the head 72 and projection 73 are recessed within the casing 31 to prevent prying.

The rearward face 39 of the casing 31 is preferably flat so that when the threaded stud 71 is fully engaged within the threaded hole 16 in the instrument body 18, the rearward face 39 of the casing is parallel to the outer surface 22 of the bracket arm 20, as shown in FIG. 3.

A stop member 80, which in the preferred embodiment is a metal pin, is attached to the rearward face 39 of the casing 31 as shown in FIGS. 3, 4 and 7. The stop member 80 is adapted to fit within the bracket opening 26 when the threaded stud 71 is fully engaged within the threaded hole 16, to prevent the locking device 30 from being turned without the key 34.

FIG. 7a shows the rearward face 39 of the casing 31, and a phantom view of the bracket opening 26 with the stop member 80 positioned within the opening 26. Likewise, FIG. 7b shows an alternate embodiment wherein the stop member 80 seats into an aperture 82 in the bracket arm 20 to prevent rotation of the locking device 30. The embodiment shown in FIG. 7b is preferred if the bracket arm 20 does not have a ribbed washer 21.

FIGS. 1-7b are an exemplification of the invention and are not intended to limit the embodiments of the invention to that shown.

The locking device 30 is intended to be utilized for locking removably mountable instruments 10, such as sonar devices, LORAN receivers, depth finders, ship to shore and the like to an instrument bracket 12. The locking device 30 is designed to substitute for threaded handles 14 which are supplied with the instrument 10 and instrument bracket 12. After a threaded handle 14 is removed, the locking device 30 is attached by inserting the threaded stud 71 through the opening 26 in the instrument bracket arm 20 and aligning the threaded stud 71 with the threaded hole 16 in the instrument body 18. By holding the casing 31 and turning the locking device 30 clockwise, the threaded stud 71 is partially threadedly engaged within the hole 16. The stop member 80 should be aligned with the opening 26 in the embodiment depicted in FIG. 7a, or with the aperture in the instrument bracket arm 20 as depicted in FIG. 7b. The threaded stud 71 is fully engaged within the threaded hole 16 by inserting the key 34 in the keyhole 50 and turning the key 34 clockwise, thus causing the threaded stud 71 to rotate with the key 34 and draw the threaded stud 71 into the hole 16 until the rearward face 39 of the casing 31 abuts the outer surface 22 of the bracket arm 20 and the inner surface 24 of the bracket arm 20 abuts the instrument body 18, so that the arm 20 is tightly sandwiched between the casing rearward face 39 and the instrument body 18. If the bracket arm 20 has a ribbed washer 21 around the opening 26, then preferably a rubber washer 25 is placed between the casing 31 rearward face 39 and the ribbed washer 21, as shown in FIG. 3. When the key 34 is turned, only the tumbler housing 46 rotates within the casing 31. The casing 31 does not rotate as the key 34 is turned. Every one-quarter turn of the key 34 causes the slide tumblers 52 to be aligned with one of the four keyways 44 within the casing 31. When so aligned, the key 34 may be withdrawn and the locking device 30 locked into position. Without the key 34 the locking device 30 cannot be removed from the instrument 10 and the instrument bracket 12 because the stop member 80 abuts the bracket opening 26 to prevent the locking device 30 from being rotated counterclockwise and disengaged from the instrument 10 and bracket 12. If the bracket arm 20 does not have a ribbed washer 21 around the opening 26, an aperture 82 is preferably drilled in the arm 20 as shown in FIGS. 2b and 7b to receive the stop member 80 and prevent rotation of the locking device 30 in a counterclockwise direction. Reinserting the key 34 and turning the key 34 counterclockwise until the stop member 80 is backed out of the opening 26 or aperture 82 in the instrument bracket arm 20 allows the instrument 10 to be removed from the bracket 12.

Figure 8:
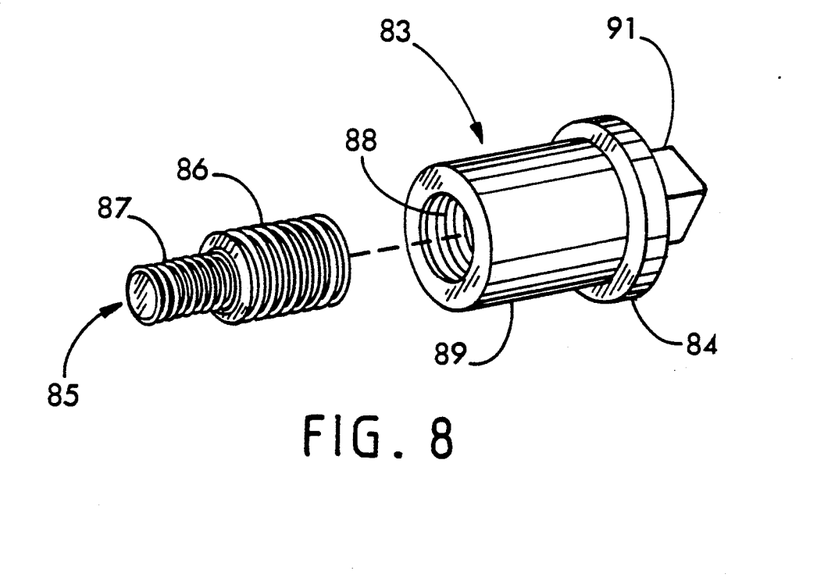
FIG. 8 is an exploded perspective view of an alternative stud unit, which allows the locking device to adapt to makes of instruments.

An alternative stud unit which allows the present locking device to adapt to many different makes of sonar units and the like is shown generally at 83 in FIG. 8. The stud unit 83 replaces the stud unit 70 of FIG. 6 and functions in the same manner. However, the stud unit 83 is composed of two parts, a head 84 and an adaptor stud 5. The adaptor stud 85 has a rearward threaded portion 6 and a forward threaded portion 87. The rearward threaded portion 86 has a diameter and pitch which allows it to be screwed into a threaded hole 88 in a collar portion 89 of the head 84 to connect it to the head. The forward portion 87 of the adaptor stud 88 has a diameter and pitch which adapts it to screw into a threaded hole in an instrument body which has a corresponding thread. The head 84 is inserted into a casing 31 in the same manner as the stud unit 70 and has a projection 91 identical to the projection 73 which seats in the recess 75 in the manner illustrated for the unit 70 in FIG. 6.

Figure 9:
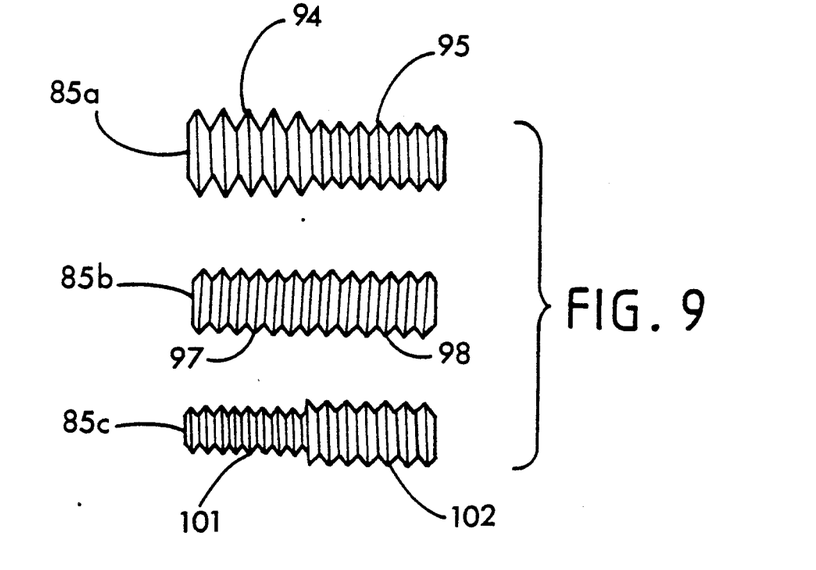
FIG. 9 is a plan view of exemplary adaptor studs.

Because various makes of instruments may have different sizes of mounting holes, it is desirable to be able to adapt a single locking device 30 to fit these various instruments. As illustrated in FIG. 9, the adaptor stud can be made in various sizes, each having a rearward portion with threads adapted to mate with the hole in the head 84 but with forward portions of different size and thread. These can include a stud 85a having a larger forward portion 94 than the rearward portion 95, a stud 85b having the forward portion 97 the same size as the rearward portion 98 (i.e, the stud has a uniform thread), and a stud 85c having a forward portion 101 which is smaller than the rearward portion 102. Of course, the adaptor studs may also have lengths of the forward portion which are adapted to the hole of a particular manufacture's instrument, and may be formed with metric or English thread sizes. The locking device 30 can be packaged for sale with several adaptor studs, each having an identical rearward portion but various sizes and threads on the forward portion. Exemplary diameters sizes for the forward portion are 3/16 inch, ¼ inch, 5/16 inch, 4 millimeter (mm), 5 mm, and 6 mm. The locking device with a plurality of adaptor studs having various sizes and threads on the forward portion may be packaged together as a kit.

It is to be understood that the present invention is not limited to the particular construction and arrangement of the parts disclosed and illustrated herein, but embraces all such modified forms thereof as come within the scope of the following claims.

What is claimed is:

1. A locking device adapted to lock an instrument to an instrument bracket, wherein the instrument is of the type which has threaded holes in opposed sides of the instrument body, and the instrument bracket has openings which align with the threaded holes, so that a threaded stud of the locking device may be passed through the bracket opening and threadedly engaged within the threaded holes to support the instrument in the bracket, the locking device comprising:

(a) a casing having a hollow interior and a rearward face;
  (b) a tumbler housing mounted for rotation within the hollow interior of the casing and locking means for allowing rotation of the tumbler housing when a proper key is inserted in the housing and preventing rotation of the housing when the key is withdrawn;
  (c) a threaded stud unit including
    (i) a threaded stud, and
    (ii) a head connected to the threaded stud and to the rearward end of the tumbler housing, so that when the key is inserted in the tumbler housing and turned, the threaded stud rotates and may be threadedly engaged within a threaded hole of the instrument;
  (d) a stop member comprising a pin extending from the rearward face of the casing which is adapted to fit within an opening in the instrument bracket when the threaded stud is fully engaged within the instrument threaded hole, so that when the key is removed from the tumbler housing, the locking device cannot be unscrewed from the instrument because the stop member is in the bracket opening and the instrument is held securely in the instrument bracket.

2. The locking device of claim 1 wherein the exterior of the casing is tapered down from the rearward face to thereby inhibit grasping of the casing by a wrench.

3. The locking device of claim 1 including a washer adapted to be inserted between the casing and the bracket, the washer having a central opening through which the threaded stud passes and an off center hole through which the stop member passes.

4. The locking device of claim 1 wherein the threaded stud has a rearward portion with threads thereon and the head has a threaded hole which accepts the threaded rearward portion of the stud by which the threaded stud is connected to the head.

5. A locking assembly for an instrument comprising:
  (a) an instrument body with opposed sides having threaded holes adapted to receive a locking handle with a threaded stud;
  (b) a bracket on each side of the instrument body with an opening that aligns with one of the threaded holes in the instrument body and an off center aperture in the bracket;
  (c) a locking device including:
    (i) a casing having a hollow interior and a rearward face;
    (ii) a tumbler housing mounted for rotation within the hollow interior of the casing and locking means for allowing rotation of the tumbler housing when a proper key is inserted in the tumbler housing, and preventing rotation of the tumbler housing when the key is removed,
    (iii) a threaded stud projecting axially from a rearward end of the tumbler housing,
    (iv) a stop member comprising a pin projecting from the rearward face of the casing which is adapted to fit within the off center aperture in the bracket, so that when the threaded stud is passed through the opening in the bracket and threadedly engaged within the threaded holes in the instrument body by turning the key in the key tumbler housing, the stop member will be within the off center aperture in the brackets and will prevent rotation of the locking device after the key is withdrawn.

6. The locking assembly of claim 5 wherein the threaded stud has a rearward portion with threads thereon and the head has a threaded hole which accepts the threaded rearward portion of the stud by which the threaded stud is connected to the head.

7. The locking assembly of claim 5 wherein the exterior of the casing is tapered down from the rearward face to thereby inhibit grasping of the casing by a wrench.

8. The lock assembly of claim 5 including a washer between the casing and the bracket, the washer having a central opening through which the threaded stud passes and an off center hole through which the stop member passes.

9. A locking device adapted to lock an instrument to an instrument bracket, wherein the instrument is of the type which has threaded holes in opposed sides of the instrument body, and the instrument brackets have openings which align with the threaded holes, so that a threaded stud of the locking device may be passed through the bracket opening and threadedly engaged within the threaded holes to support the instrument in the bracket, the locking device comprising:

(a) a casing having a hollow interior and a rearward face;
  (b) a tumbler housing mounted for rotation within the hollow interior of the casing and locking means for allowing rotation of the tumbler housing when a proper key is inserted in the housing and preventing rotation of the housing when the key is withdrawn;
  (c) a threaded stud unit connected to the tumbler housing including
    (i) a head having a threaded hole therein;
    (ii) a threaded stud with a forward portion having threads adapted to screw into the threaded hole in the instrument and a rearward portion having threads adapted to screw into the threaded hole in the head by which the threaded stud is connected to the head so that when the key is inserted in the tumbler housing and turned, the threaded stud rotates and the forward portion thereof may be threadedly engaged within a threaded hole of the instrument;
  (d) means on the casing for engaging the instrument bracket when the threaded stud is fully engaged within the instrument threaded hole so that when the key is removed from the tumbler housing, the locking device cannot be unscrewed from the instrument, the means comprising a pin extending from the rearward face of the casing and adapted to engage an off center aperture formed in the bracket.

10. The locking device of claim 9 wherein the exterior of the casing is tapered down from the rearward face to thereby inhibit grasping of the casing by a wrench.

11. The locking device of claim 9 including a washer adapted to be inserted between the casing and the bracket, the washer having a central opening through which the threaded stud passes and an off center hole through which the stop member passes.

12. A kit for a locking device adapted to lock an instrument to an instrument bracket, wherein the instrument has threaded holes in opposed sides of the instrument body, and the instrument bracket has openings which align with the threaded holes, so that a threaded stud of the locking device may be passed through the bracket opening and threadedly engaged within the threaded holes to support the instrument in the bracket, the kit comprising:

(a) a casing having a hollow interior and a rearward face;

(b) a tumbler housing mounted for rotation within the hollow interior of the casing and locking means for allowing rotation of the tumbler housing when a proper key is inserted in the housing and preventing rotation of the housing when the key is withdrawn;

(c) a head connected to the tumbler housing within the casing to rotate with the housing, the head having a threaded hole therein;

(d) a stop member comprising a pin extending from the rearward face of the casing which is adapted to fit within the opening in the instrument bracket when the forward portion of a threaded stud is fully engaged within the instrument threaded hole, so that when the key is removed from the tumbler housing, the locking device cannot be unscrewed from the instrument because the stop member abuts the bracket opening and the instrument is held securely in the instrument bracket;

(e) a plurality of adaptor studs, each adaptor stud having a rearward portion with threads thereon adapted to screw into the threaded hole in the head by which the stud may be connected to the head, and each adaptor stud having a forward portion with different size threads thereon so that each adaptor stud is adapted to screw into a different size and thread of hole in an instrument.

13. The kit of claim 12 including a washer adapted to be inserted between the casing and the instrument bracket, the washer having a central opening through which the threaded stud can be passed and an off center hole through which the stop member can be passed.

14. The kit of claim 12 wherein the exterior of the casing is tapered down from the rearward face to thereby inhibit grasping of the casing by a wrench.

* * * * *

UNITED STATES PATENT AND TRADEMARK OFFICE
CERTIFICATE OF CORRECTION

PATENT NO. : 5,063,763
DATED : November 12, 1991
INVENTOR(S) : Clyde T. Johnson It is certified that error appears in the above-identified patent and that said Letters Patent is hereby corrected as shown below:

Column 3, line 7 insert --cross -- before "section".

Column 3, line 13 insert --showing -- before the first occurrence of "the".

Column 3, line 15 insert --the -- before "threaded".

Column 3, line 19 insert --tumbler -- before "housing.".

Column 3, line 20 insert --view -- before "of".

Column 3, line 25 insert --an -- before "aperture".

Column 3, line 29 insert --different -- before "makes".

Column 6, line 27 "5." should be --85.--

Column 6, line 28 "6" should be --86--.

Signed and Sealed this

Eighteenth Day of May, 1993

Attest:

MICHAEL K. KIRK

*Attesting Officer*     *Acting Commissioner of Patents and Trademarks*